US011146982B2

(12) United States Patent
Desai et al.

(10) Patent No.: US 11,146,982 B2
(45) Date of Patent: Oct. 12, 2021

(54) SYSTEMS AND METHODS FOR AUTOMATIC ADJUSTMENT OF CELL EDGE SENSITIVITY

(71) Applicant: Cisco Technology, Inc., San Jose, CA (US)

(72) Inventors: Vishal Satyendra Desai, San Jose, CA (US); Jerome Henry, Pittsboro, NC (US); John Matthew Swartz, Lithia, FL (US); Joshua David Suhr, Lenexa, KS (US); Indermeet Singh Gandhi, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 149 days.

(21) Appl. No.: 16/560,604

(22) Filed: Sep. 4, 2019

(65) Prior Publication Data

US 2021/0068001 A1 Mar. 4, 2021

(51) Int. Cl.
| | | |
|---|---|---|
| H04J 1/16 | (2006.01) | |
| H04L 1/00 | (2006.01) | |
| H04L 12/16 | (2006.01) | |
| H04W 28/02 | (2009.01) | |
| H04L 12/26 | (2006.01) | |
| H04L 12/24 | (2006.01) | |

(52) U.S. Cl.
CPC ....... *H04W 28/0242* (2013.01); *H04L 41/142* (2013.01); *H04L 43/16* (2013.01)

(58) Field of Classification Search
CPC ... H04W 28/0242; H04L 41/142; H04L 43/16

USPC .......................................................... 370/232
See application file for complete search history.

(56) References Cited

U.S. PATENT DOCUMENTS

| | | | |
|---|---|---|---|
| 9,332,557 B2 | 5/2016 | Stager et al. | |
| 10,257,650 B2 | 4/2019 | Wirola et al. | |
| 2010/0002610 A1* | 1/2010 | Bowser | G06F 1/3209 |
| | | | 370/311 |

(Continued)

OTHER PUBLICATIONS

Cisco ("High Density WiFi Networks", Matt Swartz) (Year: 2013).*
Florwick, Jim, "Improve Enterprise WLAN," www.ciscolive.com, Jan. 28-Feb. 1, 2019, pp. 1-130.

*Primary Examiner* — Maharishi V Khirodhar
(74) *Attorney, Agent, or Firm* — Polsinelli (57) ABSTRACT

The present disclosure provides systems and methods for dynamically adjusting cell coverage sensitivity to address asymmetry of wireless cells that affect upstream and downstream traffic mismatch. In one aspect, a method includes estimating, at a network controller, one or more packet demodulation thresholds for an access point; sending, by the network controller, the one or more packet demodulation thresholds to the access point; receiving, from the access point, collected statistic, the collected statistics being link performance characteristics between the access point and one or more endpoints associated with the access point measured by one or more sensors associated with the access point; updating, at the network controller, the one or more packet demodulation thresholds based on the collected statistics to yield an updated packet demodulation threshold; and configuring, by the network controller, the access point with the updated demodulation threshold.

20 Claims, 5 Drawing Sheets

(56) References Cited

U.S. PATENT DOCUMENTS

| | | | |
|---|---|---|---|
| 2012/0155301 A1* | 6/2012 | Miyazaki | H04W 28/06 370/252 |
| 2014/0323087 A1* | 10/2014 | Huang | H04W 48/20 455/411 |
| 2018/0242169 A1 | 3/2018 | Kowal et al. | |
| 2019/0191369 A1 | 7/2019 | Desai et al. | |

* cited by examiner

SYSTEMS AND METHODS FOR AUTOMATIC ADJUSTMENT OF CELL EDGE SENSITIVITY

TECHNICAL FIELD

The subject matter of this disclosure relates in general to the field of computer networking, and more particularly, to systems and methods for dynamically adjusting cell coverage sensitivity to address asymmetry of wireless cells that affect upstream and downstream traffic mismatch.

BACKGROUND

A Wi-Fi cell is typically defined as a geographical area in which an associated access point of such cell provides wireless connectivity to one or more endpoints present in the geographical area. Wi-Fi cells are asymmetric, which means that a corresponding access point's position and its transmission/reception (Tx/Rx) capabilities are different from that of most of the served endpoints communicating from the ground with constrained form factors. The result of such asymmetry is upstream and downstream traffic mismatch (for example, an endpoint may determine that it can transmit traffic to the access point but the access point detects signal from another far-away system or vice versa). One method to avoid this asymmetry is to adjust the access point's Receiver Start of Packet (RX-SOP) detection threshold, thus controlling the signal level (in dBm) at which the access point starts considering (and demodulating) frames. This RX-SOP threshold of an access point affects cell edge sensitivity of the corresponding Wi-Fi cell.

Adjustments to RX-SOP are currently performed manually. At the time of network design, the cell activity is not known, and RX-SOP settings often become "best guesses". A wrong RX-SOP value results in traffic drops for clients at the edge of the cells or in high frame losses. Furthermore, endpoint density within a Wi-Fi cell or types of endpoints may change over time and a RX-SOP setting valid at time t may become suboptimal (or damaging) at time (t+n).

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

As noted above, adjusting the Receiver Start of Packet (RX-SOP) detection threshold of a given access point serving a corresponding Wi-Fi cell can address the asymmetry between upstream and downstream traffic mismatch. Currently utilized adjustment methods are manual and do not address problems related to non-uniformity of density and type of endpoints in a given cell area at any given point of time. Furthermore, wrong RX-SOP value results in traffic drops for endpoints at the edge of the cells or in high frame losses. As will be described further below, the present disclosure provides a new RX-SOP controlling mechanism that automates the adjustment of RX-SOP thresholds based on multi-dimensional radio frequency (RF) statistics collected from RF neighborhoods using sensors.

In one aspect, a method includes estimating, at a network controller, one or more packet demodulation thresholds for an access point; sending, by the network controller, the one or more packet demodulation thresholds to the access point; receiving, from the access point, collected statistic, the collected statistics being link performance characteristics between the access point and one or more endpoints associated with the access point measured by one or more sensors associated with the access point; updating, at the network controller, the one or more packet demodulation thresholds based on the collected statistics to yield an updated packet demodulation threshold; and configuring, by the network controller, the access point with the updated demodulation threshold.

In one aspect, a network node includes one or more memories having computer-readable instructions stored therein and one or more processors. The one or more processors are configured to execute the computer-readable instructions to estimate one or more packet demodulation thresholds for an access point; send the one or more packet demodulation thresholds to the access point; receive, from the access point, collected statistic, the collected statistics being link performance characteristics between the access point and one or more endpoints associated with the access point measured by one or more sensors associated with the access point; update the one or more packet demodulation thresholds based on the collected statistics to yield an updated packet demodulation threshold; and configure the access point with the updated demodulation threshold.

In one aspect, one or more non-transitory computer-readable media includes computer-readable instructions, which when executed by one or more processors, cause the one or more processors to estimate one or more packet demodulation thresholds for an access point; send the one or more packet demodulation thresholds to the access point; receive, from the access point, collected statistic, the collected statistics being link performance characteristics between the access point and one or more endpoints associated with the access point measured by one or more sensors associated with the access point; update the one or more packet demodulation thresholds based on the collected statistics to yield an updated packet demodulation threshold; and configure the access point with the updated demodulation threshold.

DETAILED DESCRIPTION

Figure 1:
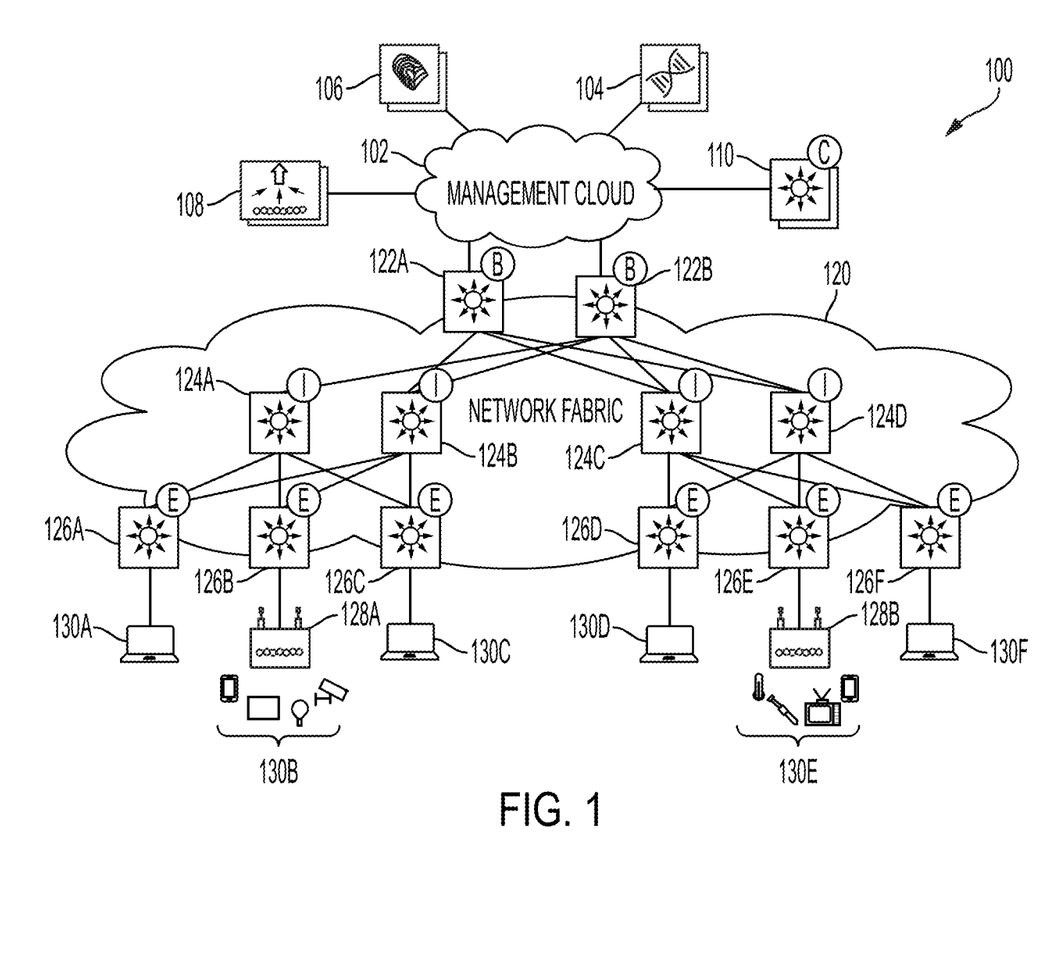
FIG. 1 illustrates an example setting of a physical topology of an enterprise network, according to one aspect of the present disclosure.

FIG. 1 illustrates an example setting of a physical topology of an enterprise network, according to one aspect of the present disclosure.

FIG. 1 illustrates an example of a physical topology of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others. In some example embodiments, one or more Digital Network Architecture (e.g., Cisco DNA™) appliances can operate as the network controller appliance(s) 104 and may be referred to as a DNA controller 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 106 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122. Network fabric 120 may represent an example of a data center.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some example embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

FIG. 1 illustrates a simple network fabric 120 (an example data center) having a spine-leaf structure in which nodes 126A to 126F may be referred to as leaf nodes or repair nodes, nodes 124A to 124D may be referred to as intermediate/spine nodes or top of pod (ToP) nodes and nodes 122A and 122B may be referred to as top of fabric (ToF) or super spine nodes. One or more network prefixes can be associated with each of leaf nodes 126A to 126F such as network prefixes of endpoints 130A to 130F. As noted above, nodes 126A to 126F, 124A to 124D and 122A and 122B can be switches.

Figure 2:
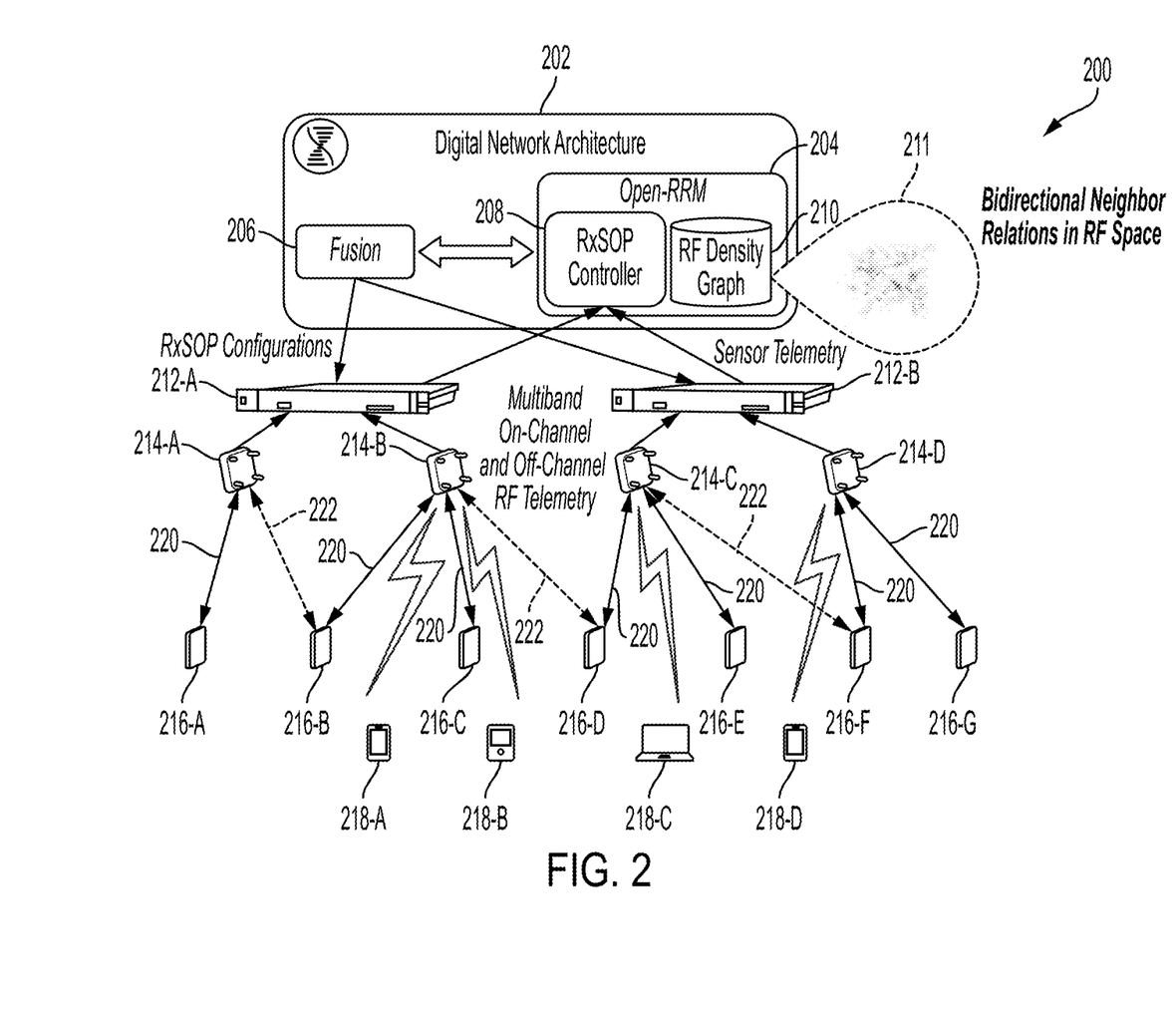
FIG. 2 illustrates a partial representation of network of FIG. 1, according to one aspect of the present disclosure.

FIG. 2 illustrates a partial representation of network of FIG. 1, according to one aspect of the present disclosure. Network 200 may include digital network architecture controller (DNA-C) 202, which may be the same as DNA controller 104 described with reference to FIG. 1. DNA-C 202 may include, among other known or to be developed components, a Radio Resource Management (RRM) component 204 that may bidirectionally communicate with a component called fusion 206.

RRM 204 can include an RX-SOP controller 208 and a database 210 that may be referred to as the RF density graph database 210 that can provide an overview (a visual overview or graph representation 211) of RF connectivity for all of network components of network 200 and similarly network 100 of FIG. 1 RX-SOP controller 208 and its functionalities will be further described below with reference to FIGS. 3 and 4.

Fusion 206 can function as a data aggregator/filter that functions to pass along configuration updates (e.g., RX-SOP configurations) and changes from RRM 204 to various downstream components such as WLCs 212A-B (collectively referred to as WLCs 212), access points 214A-D (collectively referred to as access points 214), sensors 216A-G (collectively referred to as sensors 216) and one or more endpoints 218A-D (collectively referred to as endpoints 218). It should be noted that the number of WLCs 212, access points 214, sensors 216 and/or endpoints 218 are not limited to those shown in FIG. 2 and may be more or less.

It should be noted that components of DNA-C 202 may be software defined logical components and services where computer-readable instructions stored in one or more associated memories, when executed by one or more processors, cause DNA-C 202 to perform functionalities of fusion 206, RX-SOP controller 208 and/or present RF density graph (visual presentation 211).

WLCs 212 may be the same as WLCs 108 of FIG. 1 and hence will not be described further. As shown in FIG. 2, RRM 204 may receive various collected statistics (which will be described below) from WLCs 212.

Access points 214 may be the same as access points 128 of FIG. 1 and hence will not be described further. One or more endpoints 218 may be the same as one or more endpoints 130 of FIG. 1 and hence will not be described further.

Sensors 216 may be any type of sensor or wireless device capable of communicating with one or more of access points 214 and collecting various types of statistics related to wireless performance of endpoints 130 and the corresponding access point 214 to which the endpoints 130 are connected. As will be further described below, examples of collected statistics include, but are not limited to, percentage of acknowledgements (ACKs) from corresponding access point 214 at various/different data rates, percentage of data upload and download retries, cyclic redundancy checks, etc. An example of such sensors 216 is Aironet Active Sensor developed and manufactured by Cisco Technology, Inc. of San Jose, Calif.

As also shown in FIG. 1, sensors 216 can be associated with more than one access point 214 and communicate with the same using multiband on-channel (shown using solid lines 220) and/or off-channel RF telemetry (shown using dashed lines 222), as will be further described below.

Having described various network structure examples with reference to FIGS. 1 and 2, the disclosure now turns to examples of implementing a new RX-SOP controlling mechanism that automates the adjustment of RX-SOP thresholds (packet demodulation threshold) based on multi-dimensional radio frequency (RF) statistics collected from RF neighborhoods using sensors, which in turn determines cell edge sensitivity of any given wireless cell.

Figure 3:
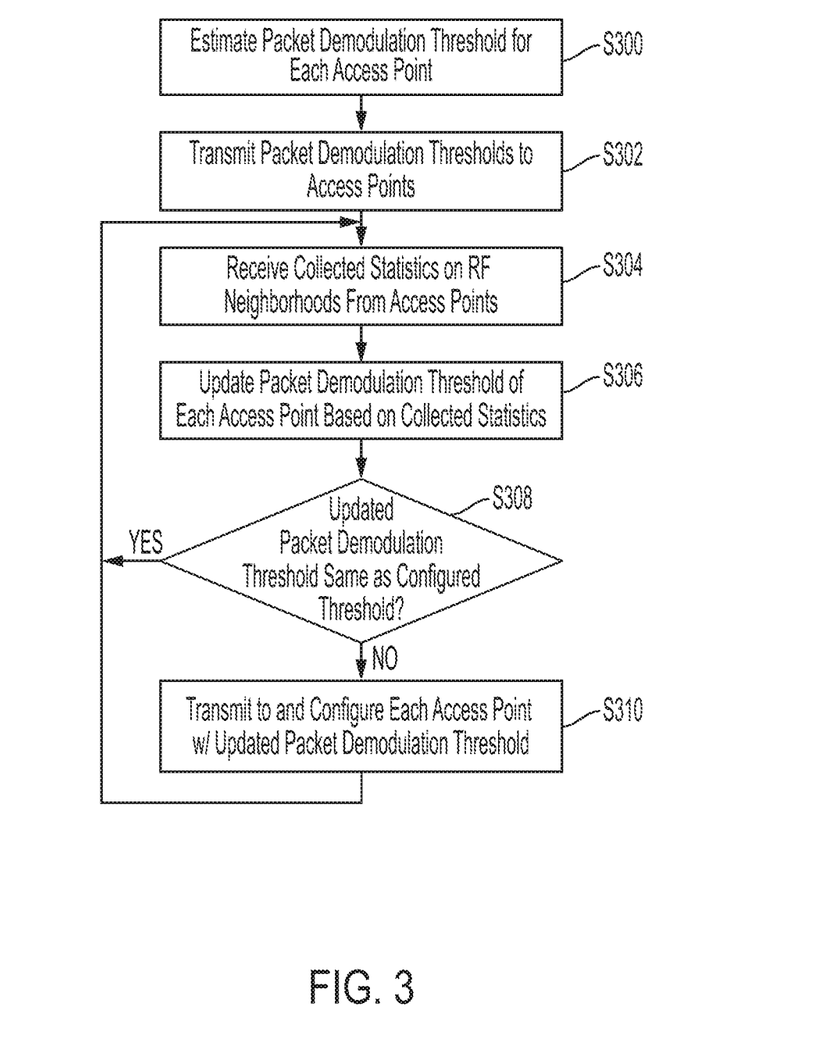
FIG. 3 is an example method of automatic adjustment of packet demodulation thresholds, according to one aspect of the present disclosure.

FIG. 3 is an example method of automatic adjustment of packet demodulation thresholds, according to one aspect of the present disclosure. FIG. 3 will be described from the perspective of a network controller such as DNA-C 202, which may be the same as the network controller appliances 104. However, it will be understood that DNA-C 202 may have one or more associated processors that execute stored computer-readable instructions to implement the functionalities of RX-SOP controller 208, as described below with reference to FIG. 3.

At S300, DNA-C 202 estimates packet demodulation threshold(s) for each access point 214 and/or alternatively each group of access points 214 that are installed and operating in a given geographical location. In one example, this packet demodulation threshold may be a range of acceptable thresholds that define Wi-Fi signal level in dBm at which an access point or group of access points 214 will initiate demodulation and decoding of data packets received from associated endpoint(s) 218. In one example, the estimated packet demodulation thresholds may be based on the RF density of collocated neighboring access points 214, which DNA-C 202 can retrieve using RF density graph 210.

At S302, DNA-C 202 transmits (sends) the estimated packet demodulation threshold(s) to one or more access points 214. By sending the estimated packet demodulation thresholds, DNA-C 202 can configure each access point 214 with the corresponding one of estimated packet demodulation threshold(s). Upon receiving the corresponding packet demodulation threshold, each access point 214 notifies the corresponding sensor(s) 216 associated with it, of the packet demodulation threshold with which the access point 214 is configured. This notifying process, in one example, may be performed via vendor specific custom information element that is embedded in a wireless beacon (e.g., IEEE 802.11 beacon) or an action frame. While wireless beacons and actions frames are two possible transmission mechanisms for notifying the sensors of the thresholds with which access points are configured, other known or to be developed transmission mechanisms are also within the scope of the present disclosure.

In one example, upon receiving the notification, sensor(s) 216 associated with any given access point 214 from which the notification is received, start collecting a set of statistics corresponding to measurements of link tests. This may be referred to as collected statistics on RF neighborhoods. Such collected statistics include, but are not limited to, percentage of acknowledgements (ACKs) from corresponding access point 214 at various/different data rates, percentage of data upload and download retries, cyclic redundancy checks, etc. This collected statistics are indicative of impact of packet demodulation thresholds with which the corresponding access point 214 is configured, which as will be described below, will be used by DNA-C 202 to adjust the packet demodulate thresholds.

In one example, the statistics can be collected on multiple Wi-Fi spectrums to gauge RxSOP impact on 2.4 GHz and 5 GHz spectrum (and, in later implementations, in other spectrum segments, e.g. 6 GHz or 3.5 GHz, etc.).

These collected statistics will then be relayed back (using multi-band on-channel reporting) by sensor(s) 216 to corresponding access point 214 and eventually to DNA-C 202 for updating packet demodulation thresholds, which will be described below. In another example, sensor(s) 216 may perform off-channel telemetry reporting not to their corresponding access point 214 but rather to a neighboring access point 214. Off-Channel telemetry reports can be effective where aggressive packet demodulation thresholds (Rx-SOP) prevent an access point from "hearing" its corresponding sensors 216's telemetry.

In one example, sensor(s) 216 may collect the statistics periodically (where the duration of each period is a configurable parameter that can be set based on experiments and/or empirical studies). Accordingly, collected statistics may be sent back to corresponding access point(s) 214 periodically as well.

After sensor(s) 216 report collected statistics to their corresponding access point 214 and/or neighboring access point(s) 214, the recipient access point(s) in turn report the received collected statistics back to DNA-C 202.

Accordingly, at S304, DNA-C 202 receives the collected statistics from one or more access points 214.

At S306, DNA-C 202 updates packet demodulation threshold of each access point 214 based on the collected statistics received at S304 to yield an updated packet demodulation threshold for each access node 214. Updating of a packet demodulation threshold will now be described with reference to FIG. 4.

Figure 4:
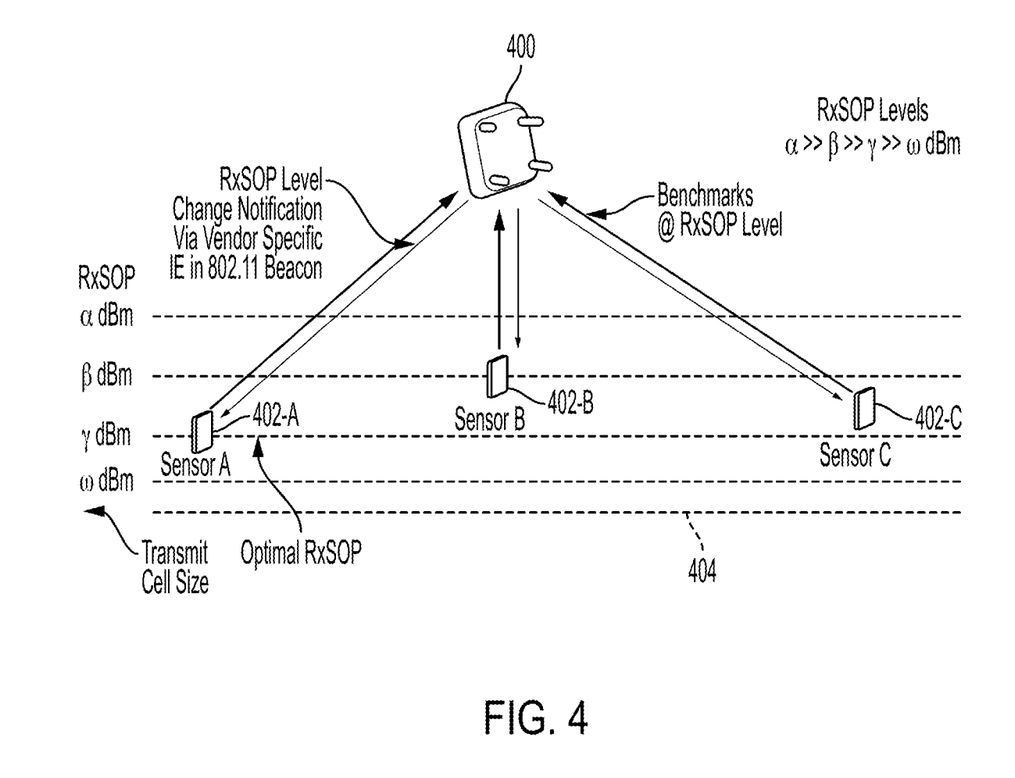
FIG. 4 illustrates an example of determining a packet demodulation threshold, according to an aspect of the present disclosure.

FIG. 4 illustrates an example of determining a packet demodulation threshold, according to an aspect of the present disclosure. For purposes of illustration, a single access point is selected and described in FIG. 4, which can be any one of access points 214 of FIG. 2. However, the same methodology is applied by DNA-C 202 for adjusting/updating packet demodulation threshold of any given access point 214.

In example of FIG. 4, it is shown that access point 400 is associated with three example sensors 402-A, 402-B and 402-C. Between access point 400 and each of sensors 402-A, 402-B and 402-C, there is a bi-direction communication, where on a downlink, access point 400 may notify each sensor of its configured initial or updated packet demodulation threshold (i.e., Rx-SOP) and on the uplink receives collected statistics from the corresponding one of sensors 402-A, 402-B and 402-C.

At first, DNA-C 202 notifies access point 400 of macro levels (packet demodulation thresholds α, β, γ and ω, in dBm). Then, access point 400 sends the initial packet demodulation thresholds to sensors 402-A, 402-B and 402-C. Sensors 402-A, 402-B and 402-C will start comprehensive RF Link test and report collected statistics back to DNA-C 202 via the access point 400 (or alternatively via a wired connection). As can be seen from FIG. 4, setting the packet demodulation threshold at β dBm results in access point 400 only being able to receive collected statistics from sensor 402-B while DNA-C 202 may receive collected statistics by sensors 402-A and 402-C from other access points via off-channel telemetry as described above. Accordingly, DNA-C 202 determines that packet demodulation threshold of β dBm is "aggressive."

However, off-channel telemetry indicates that sensors 402-A and 402-C may be heard at packet demodulation threshold of γ dBm, as shown in FIG. 4. Thereafter, DNA-C 402 may adjust the packet demodulation threshold from β dBm to γ dBm. Therefore, γ dBm is the optimal packet demodulation threshold. Consequently and as can be seen from FIG. 4, while α and β may be "aggressive" packet demodulation thresholds, ω dBm is also considered a suboptimal and a "loose" threshold.

In FIG. 4, dashed line 404 is indicate of the outer edge of a cell area covered/serviced by access point 400.

With packet demodulation threshold adjusted and updated at S306 as described above with reference to FIG. 4, at S308, DNA-C 202 determines if, for each access node 214, the updated packet demodulation threshold is different than a previously determined (currently configured) packet demodulation threshold of the same access node 214. If not the process reverts back to S304. If different, then at S310, DNA-C 202 transmits (sends) the updated packet demodulation threshold of each access point 214 back to the corresponding access point 214 and configures each access point 214 with an updated packet demodulation threshold.

Thereafter, the process may revert back to S304, where DNA-C 202 periodically receives updated collected statistics and repeats S304, S306, S308 and S310 to periodically update the packet demodulation threshold (RX-SOP) for each access point 214.

Examples of FIGS. 3 and 4 may be referred to as a method of sensor to access point (sensor to AP) telemetry whereby statistics collected by sensors 216 are used by DNA-C 202 to update/adjust packet demodulation thresholds of access points.

In another example and as an enhancement of method of FIG. 3, each access point 214 may have a dedicated monitor radio (example; AP4800 developed and marketed by Cisco Technology, Inc. of San Jose, Calif.) that can perform access point-to-access point (AP to AP) packet demodulation threshold detection with various range of transmit powers. AP to AP packet demodulation threshold detection can be performed where monitor radio of each access point 214 can demodulate messages from neighboring access points. Such messages can be of three types, unicast messages that a neighboring access point sends to endpoints connected thereto, broadcast messages that an access point sends to all (all possible clients and neighboring systems in range), and AP to AP messages intended for access points to detect and know about each other. By having a monitor radio, access point 214 can tune to another channel, and check the level at which unicast messages are detected, but also the level at which broadcast messages are heard. This is useful, because these messages can be sent at different data rates (and can be heard at various distances). Last, the AP to AP message are occasional, but sent at high power (can be heard far), which each access point 214 wants to keep hearing in order to set a threshold where the broadcast messages can no longer be heard while the AP to AP messages are still heard so that each access point 214 has a complete picture of its operating environment (of other APs in its vicinity).

Combining AP to AP with sensor to AP telemetry (described above) will provide comprehensive view at the packet demodulation threshold optimizations in a given RF environment. Such monitor radio will also help gather more granular off-channel sensor telemetry when a nearby access point is not able to demodulate its associated sensor telemetry.

In another example, IEEE 802.11ax clients (e.g., endpoints 218) are also used as lighthouse references to calibrate packet demodulation threshold through Basic Service Set (BSS) Coloring range tests. In this example, the assumption is made that sensors 216 may not always be positioned at the edge of the cell for a given access point (but within the cell, with clients farther away from the access point). Furthermore, two neighboring access points (e.g., access points 214-A and 214-B of FIG. 2) are expected to be on different channels. In one example, access point 214-A and its associated sensor(s) (e.g., sensor 216-A) may temporarily switch to access point 214-B's channel and exchange test frames as above, for a given packet demodulation threshold value. Access point 214-B then observes if its IEEE 802.11ax clients (e.g., endpoints 218-A and 218-B) at the edge report BSS coloring collisions, and also detects if access point 214-A receives these reports (as access point 214-A is temporarily on the access point 214-B's channel). Such report is used to validate the cell range, and ensure that the packet demodulation threshold of access point 214-B is set to a level that allows access point 214-B to detect endpoint at the end of its corresponding cell, even if its associated sensor(s) is/are not located at the edge.

By combining these methods in iterative and hierarchical ways, the packet demodulation threshold can be adjusted dynamically by DNA-C 202, both increased and/or decreased, for each access point 214, thus ensuring that the packet demodulation threshold is maintained at its optimal level to maximize the cell performances.

As described, the present disclosure leverages a network controller (e.g., DNA-C 202) having a holistic view of the network, to dynamically adjust start of packet (packet demodulation threshold) on each access point based on several RF parameters from the network and sensors, as described above. As alluded to above, one of the fundamental challenges with existing RxSOP solutions, which is that start of packet determines effective Rx cell boundary of a given access point and configuring aggressive threshold would lead to client association starvation and roaming failures. Hence while client feedback is important for optimal RxSOP, aggressive threshold influences radio's Rx detection capabilities. The present disclosure addresses this challenge by leveraging a bi-directional communication exchange between a network controller, an access point and its associated sensors to receive collected statistics described above. By implicitly soliciting these statistics/benchmarks on amount of packet retries/CRCs with various RxSOP levels, network controller can determine optimal RxSOP for each access node, while complying within various sets of cell boundaries.

With above description, the disclosure now turns to describing example device/system structure that can be used as any one of DNA-C 202, an access point 214, a sensor 216, an endpoint 218 and/or other components described in the present disclosure.

Figure 5:
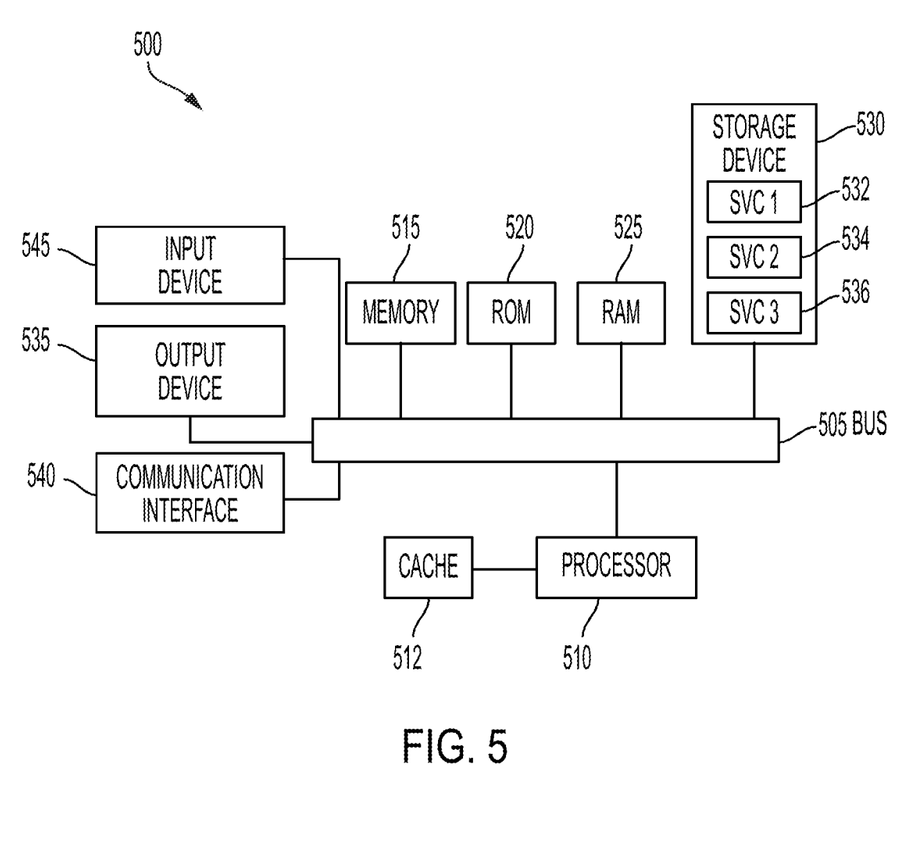
FIG. 5 illustrates an example system including various hardware computing components, according to an aspect of the present disclosure.

FIG. 5 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 5 illustrates example components and system architectures, according to aspects of the present disclosure. FIG. 5 illustrates computing system architecture for use in setting of FIG. 1 and/or FIGS. 2A-B, according to an aspect of the present disclosure. Computing system architecture (device) 500 has components that are in electrical communication with each other using a system connection 505, such as a bus. Exemplary computing device 500 includes a processing unit (CPU or processor) 510 and a system connection 505 that couples various system components including the system memory 515, such as read only memory (ROM) 520 and random access memory (RAM) 525, to the processor 510. The computing device 500 can include a cache of high-speed memory connected directly with, in close proximity to, or integrated as part of the processor 510. The computing device 500 can copy data from the system memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The system memory 515 can include multiple different types of memory with different performance characteristics. The processor 510 can include any general purpose processor and a hardware or software service, such as service (SVC) 1 532, service (SVC) 2 534, and service (SVC) 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, system connection 505, output device 535, and so forth, to carry out the function.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 505, to exchange data and signals and coordinate various types of operations by the network device 500, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information is used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances the present technology may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

The invention claimed is:

1. A method comprising:
    estimating, at a network controller, one or more packet demodulation thresholds for an access point;
    sending, by the network controller, the one or more packet demodulation thresholds to the access point;
    receiving, by the network controller and from the access point, collected statistics, the collected statistics being link performance characteristics between the access point and one or more endpoints associated with the access point measured by one or more sensors associated with the access point;
    receiving, by the network controller, off-channel telemetry;
    updating, at the network controller, the one or more packet demodulation thresholds based on the collected statistics and the off-channel telemetry to yield an updated packet demodulation threshold; and
    configuring, by the network controller, the access point with the updated demodulation threshold.

2. The method of claim 1, wherein the one or more packet demodulation thresholds includes a range of acceptable packet demodulation thresholds.

3. The method of claim 1, wherein receiving the collected statistics and updating the one or more packet demodulation thresholds is performed periodically.

4. The method of claim 1, wherein the one or more packet demodulation thresholds and the updated packet demodulation threshold are Receiver Start of Packet Detection Thresholds that identify wireless signal levels at which the access point demodulates and decodes a packet received from any of the one or more endpoints.

5. The method of claim 1, wherein the collected statistics include percentage of acknowledgements (ACKs) from corresponding access point at different data rates, percentage of data upload and download retries and cyclic redundancy checks.

6. The method of claim 1, further comprising:
receiving the collected statistics from one or more access points neighboring the access point, via off-channel telemetry.

7. The method of claim 1, wherein updating the one or more packet demodulation thresholds is further based on access point-to-access point packet demodulation threshold detection performed by the access point.

8. A network controller comprising:
one or more memories having computer-readable instructions stored therein; and one or more processors configured to execute the computer-readable instructions to:
estimate one or more packet demodulation thresholds for an access point;
send the one or more packet demodulation thresholds to the access point;
receive, from the access point, collected statistics, the collected statistics being link performance characteristics between the access point and one or more endpoints associated with the access point measured by one or more sensors associated with the access point;
receive off-channel telemetry;
update the one or more packet demodulation thresholds based on the collected statistics and the off-channel telemetry to yield an updated packet demodulation threshold; and
configure the access point with the updated demodulation threshold.

9. The network controller of claim 8, wherein the one or more packet demodulation thresholds includes a range of acceptable packet demodulation thresholds.

10. The network controller of claim 8, wherein the one or more processors are further configured to execute the computer-readable instructions to receive the collected statistics and updating the one or more packet demodulation thresholds is performed periodically.

11. The network controller of claim 8, wherein the access point is configured to embed the one or more packet demodulation thresholds in a vendor specific information element to be transmitted via a wireless beacon or an action frame to the one or more sensors.

12. The network controller of claim 8, wherein the one or more packet demodulation thresholds and the updated packet demodulation threshold are Receiver Start of Packet Detection Thresholds that identify wireless signal levels at which the access point demodulates and decodes a packet received from any of the one or more endpoints.

13. The network controller of claim 8, wherein the collected statistics include percentage of acknowledgements (ACKs) from corresponding access point at different data rates, percentage of data upload and download retries and cyclic redundancy checks.

14. The network controller of claim 8, wherein the one or more processors are further configured to execute the computer-readable instructions to receive the collected statistics from one or more access points neighboring the access point, via off-channel telemetry.

15. The network controller of claim 8, wherein the one or more processors are further configured to execute the computer-readable instructions to further update the one or more packet demodulation thresholds based on access point-to-access point packet demodulation threshold detection performed by the access point.

16. One or more non-transitory computer-readable media comprising computer-readable instructions, which when executed by one or more processors, configure the one or more processors to:
estimate one or more packet demodulation thresholds for an access point;
send the one or more packet demodulation thresholds to the access point;
receive, from the access point, collected statistics, the collected statistics being link performance characteristics between the access point and one or more endpoints associated with the access point measured by one or more sensors associated with the access point;
receive off-channel telemetry;
update the one or more packet demodulation thresholds based on the collected statistics and the off-channel telemetry to yield an updated packet demodulation threshold; and
configure the access point with the updated demodulation threshold.

17. The one or more non-transitory computer-readable media of claim 16, wherein the one or more packet demodulation thresholds includes a range of acceptable packet demodulation thresholds.

18. The one or more non-transitory computer-readable media of claim 16, wherein the execution of the computer-readable instructions by the one or more processors further cause the one or more processors to receive the collected statistics and updating the one or more packet demodulation thresholds is performed periodically.

19. The one or more non-transitory computer-readable media of claim 16, wherein the collected statistics include percentage of acknowledgements (ACKs) from corresponding access point at different data rates, percentage of data upload and download retries and cyclic redundancy checks.

20. The one or more non-transitory computer-readable media of claim 16, the execution of the computer-readable instructions by the one or more processors further cause the one or more processors to receive the collected statistics from one or more access points neighboring the access point, via off-channel telemetry.

* * * * *